United States Patent
Khanka et al.

(10) Patent No.: US 12,192,794 B2
(45) Date of Patent: Jan. 7, 2025

(54) ACCURATE SIGNAL ICON IN BOTH IDLE MODE AND CONNECTED MODE

(71) Applicant: T-Mobile Innovations LLC, Overland Park, KS (US)

(72) Inventors: Bhagwan Singh Khanka, Bothell, WA (US); Roberto Gonzalez, Seattle, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 357 days.

(21) Appl. No.: 17/696,741

(22) Filed: Mar. 16, 2022

(65) Prior Publication Data

US 2023/0300632 A1    Sep. 21, 2023

(51) Int. Cl.
| | |
|---|---|
| *H04W 24/02* | (2009.01) |
| *H04B 17/318* | (2015.01) |
| *H04W 24/08* | (2009.01) |
| *H04W 24/10* | (2009.01) |
| *H04W 28/02* | (2009.01) |

(52) U.S. Cl.
CPC .......... *H04W 24/02* (2013.01); *H04B 17/318* (2015.01); *H04W 24/08* (2013.01); *H04W 24/10* (2013.01); *H04W 28/0252* (2013.01)

(58) Field of Classification Search
None
See application file for complete search history.

(56) References Cited

U.S. PATENT DOCUMENTS

| | | | |
|---|---|---|---|
| 2011/0142022 A1* | 6/2011 | Kubo | H04N 21/4122 370/338 |
| 2014/0022918 A1* | 1/2014 | Guo | H04W 48/20 370/252 |
| 2021/0250800 A1* | 8/2021 | Meredith | H04W 28/0226 |
| 2021/0258746 A1* | 8/2021 | Humbert | H04L 65/65 |
| 2021/0302956 A1* | 9/2021 | Sudhakaran | G05D 1/0287 |
| 2021/0314238 A1* | 10/2021 | Cioffi | H04L 43/55 |
| 2022/0070875 A1* | 3/2022 | Yamamoto | H04W 72/0453 |
| 2022/0330062 A1* | 10/2022 | Zaphir | H04W 24/08 |
| 2022/0353744 A1* | 11/2022 | Shen | H04W 28/20 |
| 2022/0407759 A1* | 12/2022 | Horn | H04B 17/336 |
| 2022/0413813 A1* | 12/2022 | Moncorger | G06F 8/36 |
| 2023/0020832 A1* | 1/2023 | Hotchkiss | H04L 41/12 |
| 2023/0179503 A1* | 6/2023 | Min | H04L 43/10 370/252 |
| 2023/0300632 A1* | 9/2023 | Khanka | H04W 24/08 370/252 |

* cited by examiner

*Primary Examiner* — Kodzovi Acolatse
(74) *Attorney, Agent, or Firm* — Shook, Hardy & Bacon L.L.P.

(57) ABSTRACT

Methods, devices, media, and systems are provided for presenting an accurate signal icon to a user equipment (UE). The UE first receives network downlink measurements from a network. The UE then measures downlink metrics and uplink metrics to assess multiple factors that may affect signals, and by extension, a user's experience. The UE then calculates a UE signal experience score based on the downlink metrics and the uplink metrics. The calculated UE signal experience score is then presented on the UE. The UE display may present the UE signal experience score as a number of bars, a presentations most users are already familiar with. Alternately, the UE signal experience score may be presented as a number from 0 to 100, with a user able to select which format the UE signal experience score is displayed in.

20 Claims, 5 Drawing Sheets

ACCURATE SIGNAL ICON IN BOTH IDLE MODE AND CONNECTED MODE

SUMMARY

The present disclosure is directed, in part, to wireless telecommunications and signal icon features associated with a device, substantially as shown in and/or described in connection with at least one of the figures, and as set forth more completely in the claims.

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, a device, method, media, and system for an accurate signal icon in both idle mode and connected mode are provided. In aspects, a method for providing an accurate signal icon is presented. The method begins when a user equipment (UE) receives from a network, network downlink measurements. The UE then measures downlink metrics and uplink metrics. Once the UE has completed measuring downlink and uplink metrics, the UE calculates a UE signal experience score based on the downlink metrics and the uplink metrics. The calculated UE signal experience score is then presented on the UE to the user.

A device comprising an accurate signal icon is also provided by the disclosure. The device comprises a display, a processor, and a memory. The memory stores executable instructions that, when executed by the processor perform operations including: receiving, by a user equipment (UE) from a network, network downlink measurements; measuring, by the UE, downlink metrics and uplink metrics; calculating, by the UE, a UE signal experience score based on the downlink metrics and the uplink metrics; and presenting the UE signal experience score on the UE.

A further aspect of the disclosure provides a system. The system comprises a memory storing computer-executable instructions and a processor. The processor is configured to access the memory and to execute the computer executable instructions. The instructions comprise the steps of: receiving, by a user equipment (UE) from a network, network downlink measurements; measuring, by the UE, downlink metrics and uplink metrics; calculating, by the UE, a UE signal experience score based on the downlink metrics and the uplink metrics; and presenting the UE signal experience score on the UE.

The accurate signal icon provides mobile device users with information that may improve the user experience. Knowing signal conditions allows users to adjust device settings, move to another location, or other actions to improve their user experience. The device user will know the level of experience at a given moment in time. The accurate signal icon may be monitored on a per customer, site, and time basis, thus providing a user with current signal experience metrics. In addition, a debugging function assists technicians with prompt and accurate diagnosis of a mobile user's degraded customer experience.

BRIEF DESCRIPTION OF THE DRAWINGS

The present technology is described in detail herein with reference to the drawing figures, which are intended to be exemplary and non-limiting in nature; wherein.

DETAILED DESCRIPTION

Figure 1:
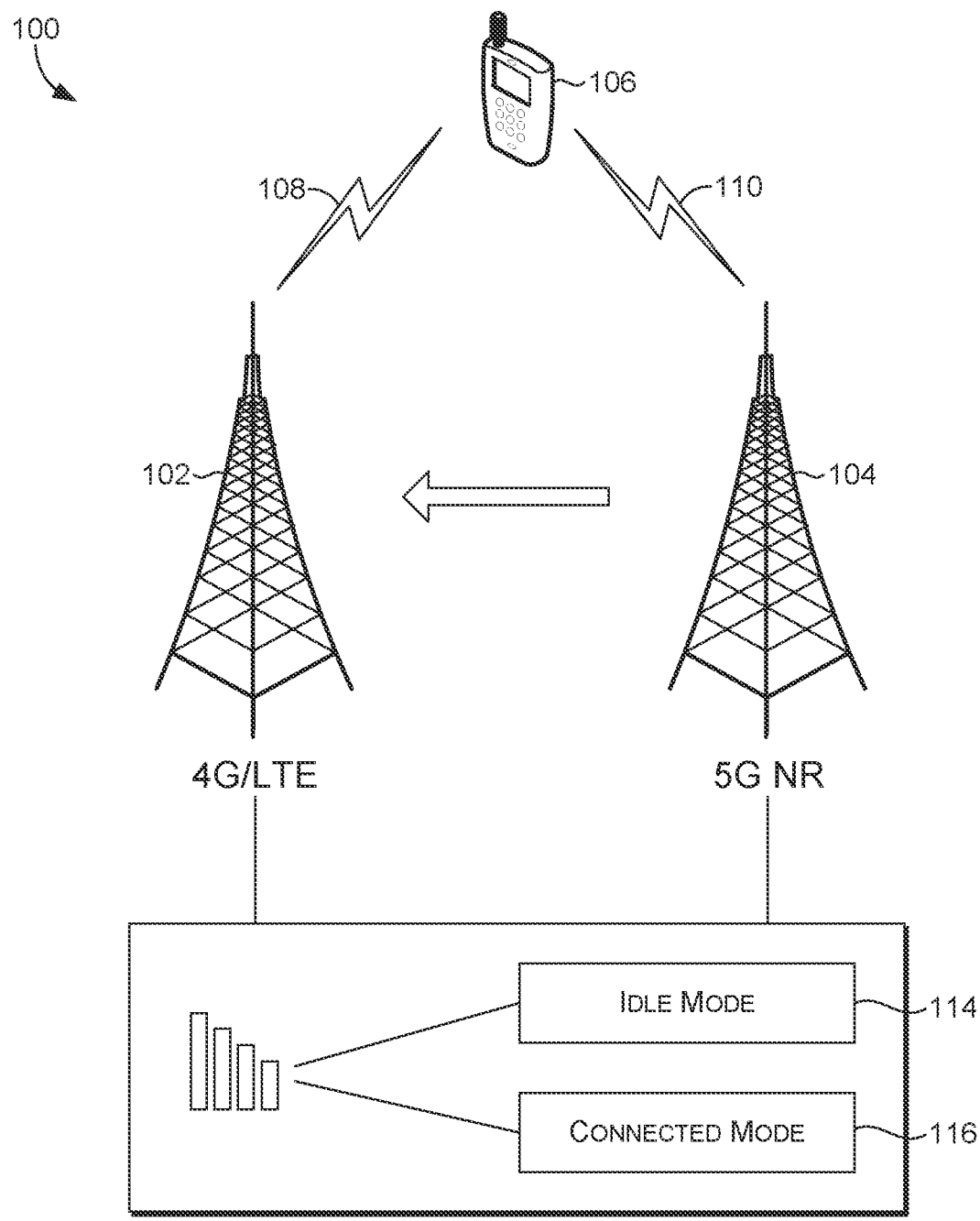
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (MI)), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 500 shown in FIG. 5. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more base stations, one or more cell sites (i.e., managed by a base station), one or more cell towers (e.g., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, MIMO (massive multiple-input/multiple-output)) as discussed herein.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touchinput component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such. Along similar lines, certain UE are described herein as being "priority" UE and non-priority UE, but it should be understood that in certain implementations UE may be distinguished from other UEs based on any other different or additional features or categorizations (e.g., computing capabilities, subscription type, and the like).

The terms "servicing" and "providing signal coverage," "providing network coverage," and "providing coverage," are interchangeably used to mean any (e.g., telecommunications) services) being provided to user devices. Moreover, "signal strength", "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and the like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/measurement, a SS signal-to-noise and interference ratio (SS-SINR) value/measurement, and/or the like. Alternatively or additionally, in some embodiments, signal strength may also be measured and provided in terms of channel state information (CSI) values.

In addition, the term "communication", as used herein with reference to a UE, refers to receiving or transmitting one or more signals. For example, a communication may include an audio communication, a textual communication, a visual communication, a haptic communication, and so forth. In addition, a signal may be an uplink signal from a UE to a base station or other network entity. Similarly, a signal may be a downlink signal from a base station or network entity to a UE. Both uplink signals and downlink signals may carry signal measurements of signal metrics, including but not limited to: signal strength, signal quality, signal to noise ratio, power, allowed bandwidth, frequency band, type of UE, etc. Further, the network entities, such as base stations, or eNode Bs (eNBs) may send via the downlink signal network information, including, but not limited to: current network loading or congestion, current backhaul congestion or loading, parameter settings on the network, etc.

In brief, and at a high level, this disclosure describes, among other things, a device as well as methods and systems for calculating an accurate signal icon in both idle mode and connected mode. Conventional signal icons on many mobile devices do not reflect the technology that the user receives and also does not reflect the experience a user expects. Often, the signal icon merely displays signal strength using a number of bars, perhaps four or five bars. A user may see five bars and yet be unable to place a call or access data services. This may occur because while the signal strength is excellent the network capacity is exceeded and no more users may be added at that time. In other situations, the parameters for the network or the phone may be set incorrectly and as a result, there is no network access. Backhaul issues may also cause dropped calls. None of these situations is anticipated by the user who sees five bars and expects a good user experience.

Users understandably become frustrated with service disruptions and poor quality calls. If a user had an indication of a such a problem, then that user may wait to make a call, move to another location, or determine that a service call is warranted. Similarly, better indication of the problem on the mobile device assists service technicians in troubleshooting network issues, such as transport problems.

Methods and systems that provide users with an accurate and timely updated signal icon offer consumers numerous advantages.

The present disclosure provides for improvements to each of the deficiencies in the conventional systems described above. In one aspect, a method for providing an accurate signal icon is given. The method begins with receiving, by a user equipment (UE), from a network, network downlink measurements. The UE then measures both downlink metrics and uplink metrics. Using the downlink and uplink metrics the UE calculates a UE signal experience score based on the downlink metrics and the uplink metrics. The UE signal experience score is then presented on the UE.

In another example embodiment of the present technology, a device comprising an accurate signal icon is also provided. In aspects, the device comprises a display, a processor, and a memory. The memory stores executable instructions that, when executed by the processor perform the following operations: receiving, by a user equipment (UE) from a network, network downlink measurement; measuring, by the UE, downlink metrics and uplink metrics; calculating, by the UE, a UE signal experience score based on the downlink metrics and the uplink signal metrics, and presenting the UE signal experience score on the UE.

In yet another example embodiment of the present technology, a server system is provided. For example, the system comprises a memory storing computer-executable instructions and a processor configured to execute the computer-executable instructions to: receiving, by a user equipment (UE) from a network, network downlink measurements; measuring, by the UE, downlink metrics and uplink metrics; calculating, by the UE, a UE signal experience score based on the downlink metrics and the uplink metrics; and presenting the UE signal experience score on the UE.

Turning now to FIG. 1, FIG. 1 depicts a diagram of an exemplary network environment 100 suitable for use in implementations of the present disclosure. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 provides service to one or more user devices, such as exemplary UE 106. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. (Example components and devices are discussed below with respect to FIG. 5.) Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through nodes 102 and 104. Nodes 102 and 104 may include one or more antennas, base transmitter stations, radios, transmitter/receivers, digital signal processors, control electronics, GPS equipment, power cabinets or power supply, base stations, charging stations, and the like. In this manner, nodes 102 and 104 may provide a communication link between UE 106 and any other components, systems, equipment, and/or devices of the network environment 100 (e.g., the beam management system). The base station and/or a computing device (e.g., whether local or remote) associated with the base station may manage or otherwise control the operations of components of nodes 102 and 104. Example components that may control the operations of components of nodes 102 and 104 are discussed below with respect to FIG. 5.

Nodes 102 and 104 may include a Next Generation Node B (e.g., gNodeB or gNB) or any other suitable node structured to communicatively couple to the UE 106, Nodes 102 and 104 may correspond to one or more frequency bands. A frequency is the number of times per second that a radio wave completes a cycle. The frequency band may include a frequency range (e.g., a lower frequency and an upper frequency) within which the user device(s) may connect to the network environment such as, but not limited to, a telecommunication network or a portion thereof. The frequency range may be measured by the wavelength in the range or any other suitable wave properties.

In some embodiments, the UE 106 may take the form of a wireless or mobile device capable of communication via the network environment 100, For example, the UE 106 may take the form of a mobile device capable of communication via a telecommunication network such as, but not limited to, a wireless telecommunication network. In this regard, the UE 106 may be any mobile computing device that communicates by way of a network, for example, a 3G, CDMA, 4G, LTE, WiMAX, 5G, 6G or any other type of network. The network environment 100 may include any communication network providing voice and/or data service(s), such as, for example, a 1x circuit voice, a 3G network (e.g., Code Division Multiple Access (CDMA), CDMA 2000, WCDMA, Global System for Mobiles (GSM), Universal Mobile Telecommunications System (UNIT'S), a 4G network (LTE, Worldwide Interoperability for Microwave Access (WiMAX), High-Speed. Downlink Packet Access (HSDPA)), a 5G network, or a 6G network.

In addition to UE 106 and nodes 102 and 104, network environment 100 includes communications links 108 and 110, accurate signal icon 112 displayed on UE 106, idle mode metrics 114, and connected mode metrics 116. Both idle mode metrics 114 and connected mode metrics 116 may provide input to the accurate signal icon 112. In network environment 100, UE 106 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wireless communications with nodes 102 and 104 in order to interact with a public or private network.

In some implementations, nodes 102 and 104 are configured to communicate with user devices, such as UE 106 and other devices that are located within the geographical area, or cell, covered by the one or more antennas of nodes 102 and 104. Nodes 102 and 104 may include one or more base stations, nodes, base transmitter stations, radios, antennas, antenna arrays, power amplifiers, transmitters/receivers, digital signal processors, control electronics, GPS equipment, and the like. In one aspect, node 102 is an eNodeB, while node 104 is a gNodeB. In particular. UE 106 may communicate with nodes 102 and 104 according to any of one or more communication protocols, in order to access the network. UE 106 may receive communications from either of nodes 102 and 104 in idle mode and may communicate with either of nodes 102 and 104 in connected mode.

In aspects, UE 106 may be in communication with node 104, which is a 5G SA system, meaning that it provides 5G connectivity to UE 106 without the use of LTE, or node 102 as shown in FIG. 1. UE 106 may move from node 104 to node 102 and may shift from idle mode 114 to connected mode 116, and vice versa. Here, node 102 (or some other network component) may provide information used to compute accurate signal icon 112 to determine a number of bars to display. Accurate signal icon 112 may also display a percentage figure in lieu of displaying bars.

Having described the network environment 100 and components operating therein, it will be understood by a person having ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by a person having ordinary skill in the art that the number, interactions, and physical location of components illustrated in FIG. 1 are examples, as other methods, hardware, software, components, and devices for establishing one or more communication links between the various components may be utilized in implementations of the present disclosure. It will be understood to a person having ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
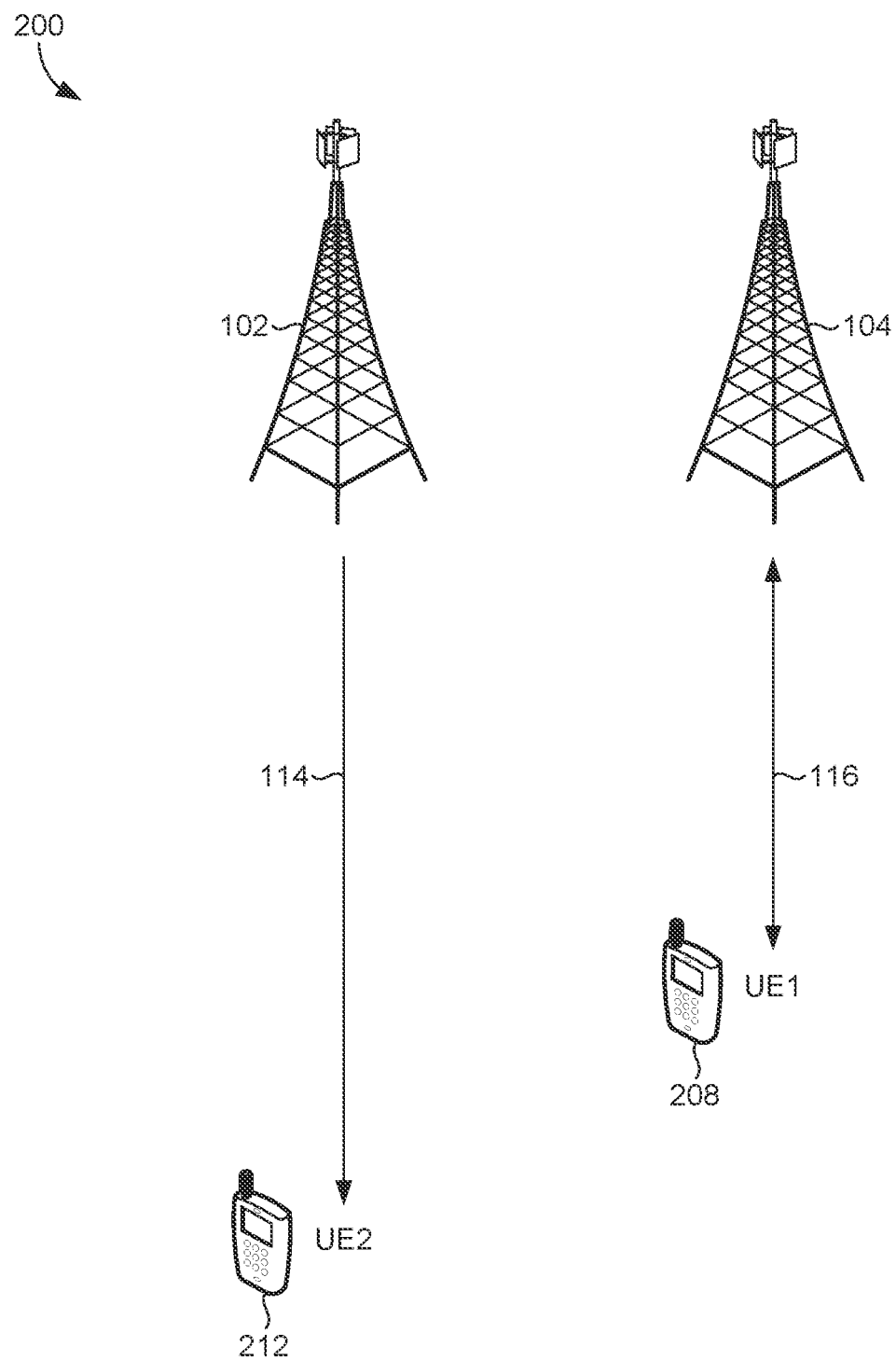
FIG. 2 depicts a diagram illustrating user equipment (UE) interfacing with a wireless communication network in both idle mode and connected mode, according to various aspects herein.

FIG. 2 is a diagram illustrating user equipment (UE) interfacing with a network in both the idle mode and the connected mode. The network signaling environment 200 may include multiple nodes, such as nodes 102 and 104. UE 2 212 may be in idle mode with node 102. Idle mode 114 is a one-way traffic mode, with UE 1 208 receiving what node 102 sends over the air. The idle mode metrics 114 are transmitted by node 102 on a separate shared channel. The transmitted idle mode metrics 114 are then used by UE 2 212 to calculate an accurate signal icon 112 as described with respect to FIG. 3.

In connected mode the connected mode metrics 116 are exchanged between node 104 and UE 1 208. Connected mode is a bi-directional traffic mode with the UE 1 208 able to provide the node 104 information on the signal quality and other connected mode metrics 116 from the perspective of UE 1 208. Conversely, node 104 may be able to provide UE 1 208 with parameters and information pertaining to network signaling environment 200. In connected mode, the UE 1 208 exchanges signaling information indicative of the current user experience and conditions with node 104.

Figure 3:
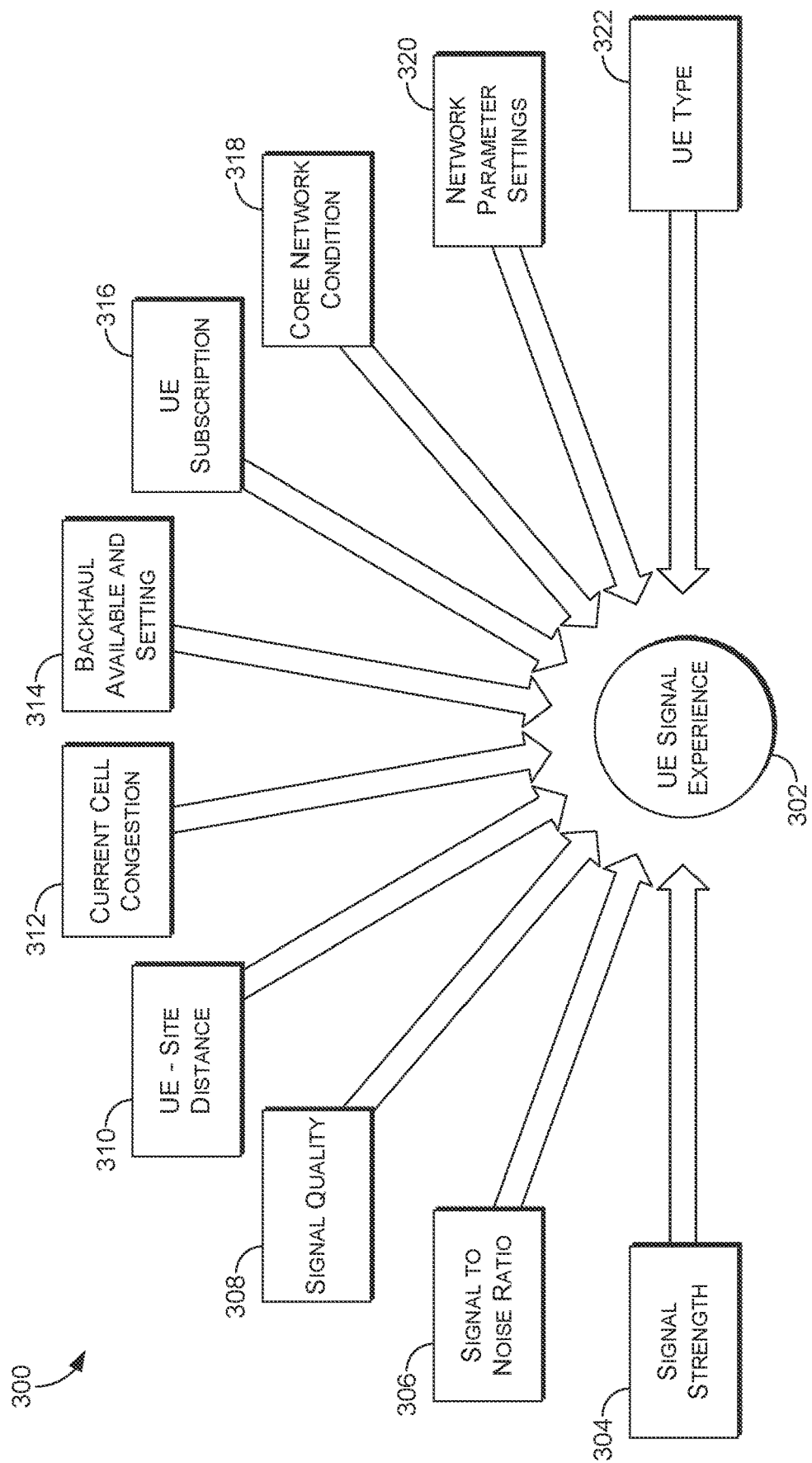
FIG. 3 depicts an example of the multiple metrics used in calculating an accurate signal icon, in accordance with aspects of the present technology

FIG. 3 depicts an example of the multiple metrics used in calculating an accurate signal icon, in accordance with aspects of the disclosure. The signal icon collection composition 300 includes multiple values used to calculate the UE signal experience 302. The UE signal experience 302 is based on signal strength 304, signal to noise ratio 306, signal quality 308, UE to site distance 310, current cell congestion 312, backhaul availability and settings 314, UE subscription 316, core network condition 318, network parameter settings 320, and UE type 322.

The UE measures the downlink conditions, which may include signal strength 304, signal to noise ratio 306, signal quality 308, and may measure additional metrics related to downlink conditions. The additional metrics may include synchronization signal (SS) measurements, channel state information (CSI) measurements, SS reference signal received power (SS RSRP), SS reference signal received quality (SS RSRQ), and SS signal to noise and interference ratio (SS SINR). In addition, the UE measures the UE to site distance 310.

The UE also measures the uplink conditions, including but not limited to: UE power, bandwidth allowed, frequency band, UE type, etc. The UE also receives information from the network and may do so in both idle and connected modes. The UE may receive the following information from the network: current network congestion, current backhaul congestion or loading, current cell congestion 312, backhaul available and setting 314, UE subscription 316, core network condition 318, network parameter settings 320, and UE type 322.

Both the uplink and downlink information are used to calculate the UE signal experience 302. The UE calculates the maximum or optimal experience possible based on the downlink and uplink conditions. The UE signal experience 302 score may be reported as a number ranging from 0 to 100. Zero indicates no network available at the time of calculation, while 100 indicates the optimal customer experience possible, based on the subscriber's subscription plan. The subscription plan governs maximum throughput for the user, with different subscription plans offering different speeds. The accurate signal icon may reflect different speeds in the display of the UE signal experience in accordance with the subscription.

The UE signal experience 302 may also be reported as a number of bars, as some users prefer the visual display to a numerical value. The user may select whether to display a numerical value or signal bars, and may toggle between the types of display.

The accurate signal icon functionality may also provide a technician mode for use in debugging activities. The technician mode may allow a technician to examine the calculations made by the UE, which may show if a parameter on the UE is inaccurate or if a frequency on the UE has drilled. Such information allows a technician to determine if the poor user experience is due to network conditions or if the problem is a UE that needs to be serviced or replaced. The technician mode may result in faster service times for customers and may provide additional confidence that problems are correctly identified. Capturing such information in the technician mode provides a device-side perspective, as congestion is difficult to see from the UE perspective, but is clear from a network viewpoint.

Figure 4:
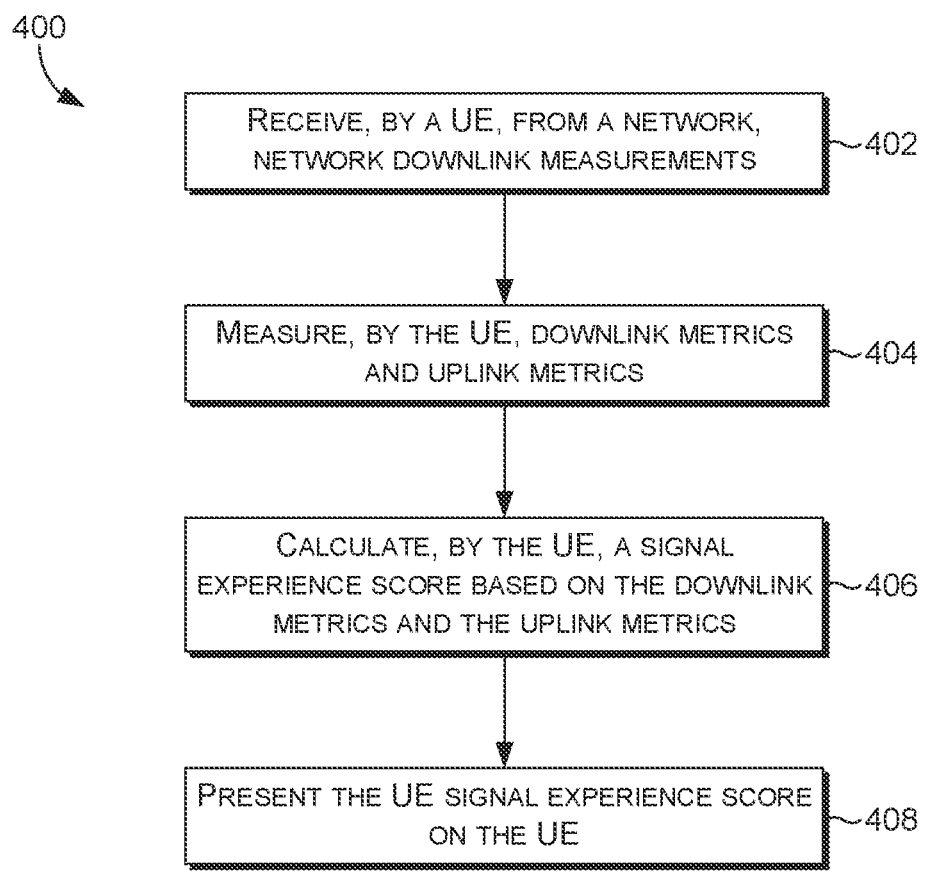
FIG. 4 depicts a flow diagram of an exemplary method for calculating an accurate signal icon, in accordance with aspects herein.

FIG. 4 depicts a flow diagram of an exemplary method for calculating an accurate signal icon, in accordance with aspects herein. The method 400, begins with step 402 with a user equipment (UE), receiving, from a network, network downlink measurements. Then in step 404 the process continues with measuring, by the UE, downlink metrics and uplink metrics. The method continues in step 406 with calculating, by the UE, a signal experience score based on the downlink metrics and the uplink metrics. In step 408 the process concludes with presenting the UE signal experience on the UE.

Figure 5:
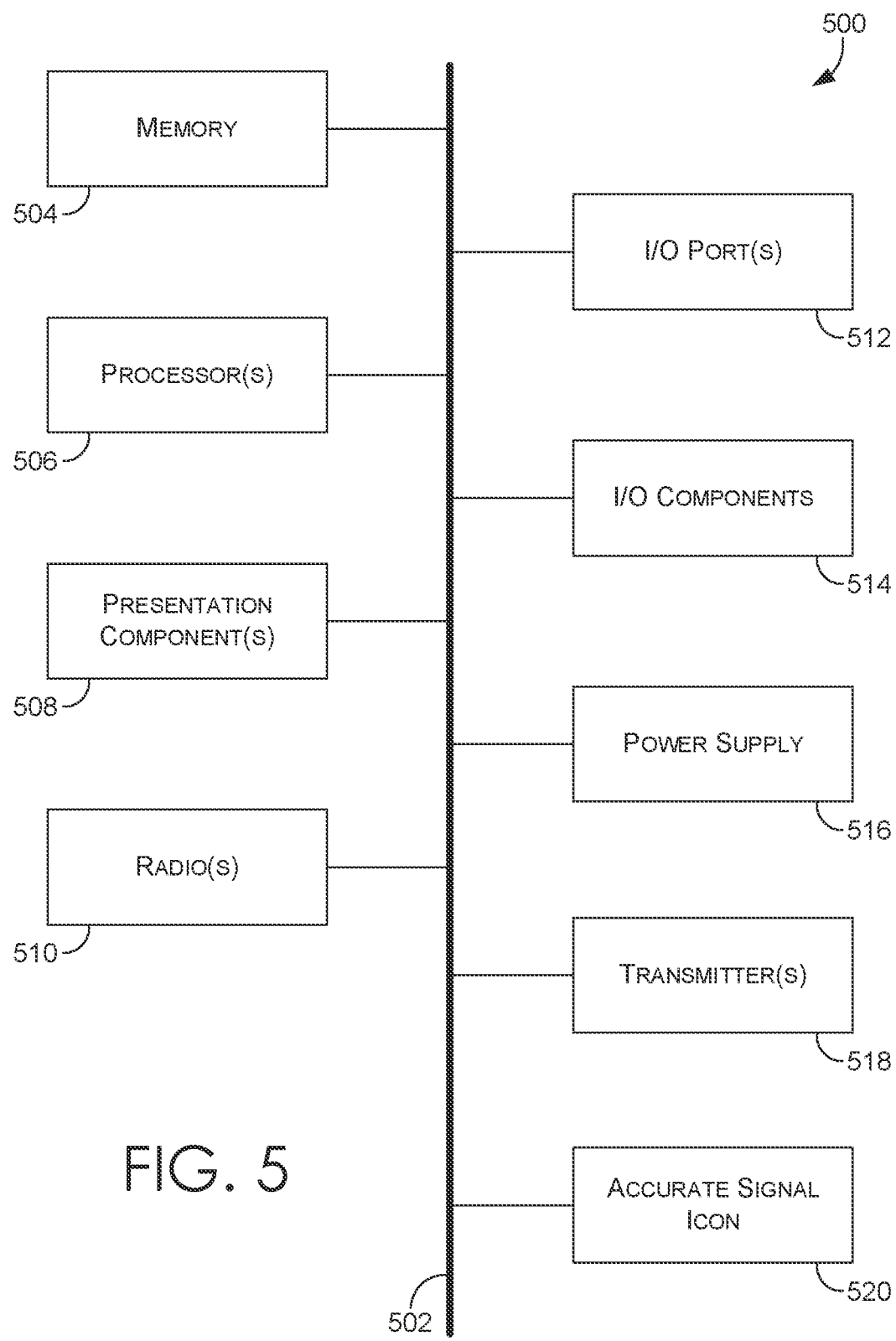
FIG. 5 depicts an exemplary computing environment suitable for use in implementations of the present disclosure.

FIG. 5, a diagram is depicted of an exemplary computing environment suitable for use in implementations of the present disclosure. In particular, the exemplary computer environment is shown and designated generally as UE/user device 500. User device 500 is but one example of a suitable computing environment and is not intended to suggest any limitation as to the scope of use or functionality of the invention. Neither should user device 500 be interpreted as having any dependency or requirement relating to any one or combination of components illustrated.

The implementations of the present disclosure may be described in the general context of computer code or machine-useable instructions, including; computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, user device 500 includes bus 502 that directly or indirectly couples the following devices: memory 504, one or more processor(s) 506, one or more presentation component(s) 508, one or more radio(s) 510, input/output (110) port(s) 512, I/O component(s) 514, power supply 516, one or more transmitter(s) 518, and accurate signal icon 520. Bus 502 represents what may be one or more busses (such as an address bus, data bus, or combination thereof). Although the devices of FIG. 5 are shown with lines for the sake of clarity, in reality delineating various components is not so clear, and metaphorically, the lines would more accurately be grey and fuzzy. For example, one may consider a presentation component such as a display device to one of I/O component(s) 514. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "user device."

User de-vice 500 typically includes a variety of computer-readable media. Computer-readable media can be any available media that can be accessed by user device 500. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM. DVD or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 504, memory 504 includes computer-storage media in the form of volatile and/or nonvolatile memory. Memory 504 may be removable, nonremovable, or a combination thereof. Examples of memory 504 include solid-state memory, hard drives, optical-disc drives, etc. For instance, memory 504 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 506, the one or more processors 506 read data from various entities such as bus 502, memory 504 or I/O component(s) 514. The one or more processors 506 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 506 execute instructions, for example, of an Operating System of the user device 500 and/or of one or more suitable applications.

Further, the one or more presentation components 508 present data indications to a person or other device. Examples of one or more presentation components 508 include a display device, speaker, printing component, vibrating component, etc. Additionally, I/O port(s) 512 allow user device 500 to be logically coupled to other devices including I/O component(s) 514, some of which may be built in user device 500. Illustrative I/O component (s) 514 may include a microphone, joystick, game pad, satellite dish, scanner, printer, wireless device, etc. Furthermore, power supply 516 may include any suitable source of power, such as a rechargeable lithium polymer battery and/or an alternating current power converter.

Turning to radio 510, the radio 510 facilitates communication with a wireless telecommunications network. For example, radio 510 may facilitate communication via wireless communication signals, RF signals, frames, blocks, transmission streams, packets, messages, data items, and/or data. The terms "radio," "controller," "antenna," and "antenna array" are used interchangeably to refer to one or more software and hardware components that facilitate sending and receiving wireless radio-frequency signals, for example, based on instructions from a cell site. Radio 510 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via mmWaves, FD-MIMO, massive MIMO, 3G, 4G, 5G, and/or 802.11 protocols and techniques, etc.

Illustrative wireless telecommunications technologies that radio 510 may facilitate include CDMA, GPRS, TDMA, GSM, and the like, Radio 510 might additionally or alternatively facilitate other types of wireless communications including WiMAX, LTE, or other VoIP communications. As can be appreciated, in various embodiments, radio 510 can be configured to support multiple technologies and/or multiple radios can be utilized to support multiple technologies.

The accurate signal icon 520 is also in communication over bus 502. Radio 510, transmitter 518, and processors 506 may be in communication with the accurate signal icon 520. The accurate signal icon 520 may be presented on the presentation component 508, such as a UE display screen.

Many different arrangements of the various components depicted, as well as components not shown, are possible without departing from the scope of the claims herein. Embodiments of the technology have been described with the intent to be illustrative rather than restrictive. Alternative embodiments will become apparent to readers of this disclosure after and because of reading it. Alternative methods of implementing the aforementioned subject matter may be performed without departing from the scope of the claims herein. Certain features and sub-combinations are of utility and may be employed without reference to other features and sub-combinations, which is contemplated as within the scope of the claims.

What is claimed is:

1. A method for providing an accurate signal icon, comprising:
   receiving, by a user equipment (UE), from a network, network downlink measurements;
   measuring, by the UE, downlink metrics and uplink metrics;
   calculating, by the UE, a UE signal experience score based on the downlink metrics and the uplink metrics; and
   presenting the UE signal experience score on the UE as a numerical value, wherein the numerical value is an indication of a maximum experience possible for the UE based on the downlink metrics and the uplink metrics.

2. The method of claim 1, further comprising: transmitting, by the UE to the network, the measured downlink metrics.

3. The method of claim 2, further comprising: transmitting, by the UE to the network, the measured uplink metrics.

4. The method of claim 1, wherein the downlink measurements comprise at least one of: signal strength, signal quality, and signal to noise ratio.

5. The method of claim 1, wherein the uplink metrics comprise at least one of: UE power, allowable bandwidth, frequency band, and type of UE.

6. The method of claim 1, further comprising: receiving, by the UE, at least one of the following: current network congestion, current backhaul congestion, network parameter settings, and UE subscription information.

7. The method of claim 6, in which the UE subscription information includes permissions for the UE.

8. The method of claim 7, in which the permissions for the UE includes at least one of: roaming, allowable data rate, and maximum speed.

9. The method of claim 1, wherein presenting the UE signal experience score on the UE shows a number of bars.

10. The method of claim 1, wherein presenting the UE signal experience score on the UE comprises presenting a numerical value in a range from 0 to 100.

11. The method of claim 1, wherein presenting the UE signal experience score on the UE allows a user to select a number of bars to display or a number to display.

12. A device comprising an accurate signal icon, the device comprising:
    a display;
    a processor; and
    a memory that stores executable instructions that, when executed by the processor, perform operations comprising:
    receiving, by a user equipment (UE), from a network, network downlink measurements;
    measuring, by the UE, downlink metrics and uplink metrics;
    calculating, by the UE, a UE signal experience score based on the downlink metrics and the uplink metrics; and
    presenting the UE signal experience score on the UE as a numerical value, wherein the numerical value is an indication of a maximum experience possible for the UE based on the downlink metrics and the uplink metrics.

13. The device of claim 12, wherein presenting the UE signal experience score is based on measured downlink metrics.

14. The device of claim 13, wherein presenting the UE signal experience score is based on measured network uplink measurements.

15. The device of claim 13, wherein the measured network downlink metrics comprise at least one of: signal strength, signal quality, and signal to noise ratio.

16. The device of claim 14, wherein the measured network uplink metrics comprise at least one of: UE power, allowable bandwidth, frequency band, and type of UE.

17. The device of claim 12, further comprising executable instructions, stored in the memory, that when executed by the processor perform further operations: receiving, by the UE, information on current network congestion, current backhaul congestion, network parameter settings, and UE subscription information.

18. The device of claim 17, in which the UE subscription information includes permissions for the UE.

19. A system comprising:
a memory storing computer-executable instructions; and
a processor configured to access the memory and to execute the computer-executable instructions to:
receiving, by a user equipment (UE), from a network, network downlink measurements;
measuring, by the UE, downlink metrics and uplink metrics;
calculating, by the UE, a UE signal experience score based on the downlink metrics and the uplink metrics; and
presenting the UE signal experience score on the UE as a numerical value, wherein the numerical value is an indication of a maximum experience possible based on the downlink metrics and the uplink metrics.

20. The system of claim 19, wherein the network downlink measurements are measured between a base station and a UE.

* * * * *